(12) United States Patent
Gorrell et al.

(10) Patent No.: US 7,442,940 B2
(45) Date of Patent: Oct. 28, 2008

(54) FOCAL PLANE ARRAY INCORPORATING ULTRA-SMALL RESONANT STRUCTURES

(75) Inventors: Jonathan Gorrell, Gainesville, FL (US); Mark Davidson, Florahome, FL (US); Michael E. Maines, Gainesville, FL (US)

(73) Assignee: Virgin Island Microsystems, Inc. VI (US)

( * ) Notice: Subject to any disclaimer, the term of this patent is extended or adjusted under 35 U.S.C. 154(b) by 370 days.

(21) Appl. No.: 11/418,098

(22) Filed: May 5, 2006

(65) Prior Publication Data

US 2007/0257739 A1   Nov. 8, 2007

(51) Int. Cl.
  *H01J 3/14* (2006.01)
(52) U.S. Cl. .................................... 250/397; 250/492.1
(58) Field of Classification Search .................. 250/397, 250/492.1, 492.21, 494.1
  See application file for complete search history.

(56) References Cited

U.S. PATENT DOCUMENTS

| | | | |
|---|---|---|---|
| 1,948,384 A | 2/1934 | Lawrence |
| 2,307,086 A | 1/1943 | Varian et al. |
| 2,397,905 A | 4/1946 | Rockwell et al. |
| 2,431,396 A | 11/1947 | Hansell |
| 2,473,477 A | 6/1949 | Smith |
| 2,634,372 A | 4/1953 | Salisbury |
| 2,932,798 A | 4/1960 | Kerst et al. |
| 2,944,183 A | 7/1960 | Drexler |
| 2,966,611 A | 12/1960 | Sandstrom |
| 3,231,779 A | 1/1966 | White |
| 3,543,147 A | 11/1970 | Kovarik |
| 3,571,642 A | 3/1971 | Westcott |
| 3,586,899 A | 6/1971 | Fleisher |
| 3,761,828 A | 9/1973 | Pollard et al. |
| 3,886,399 A | 5/1975 | Symons |
| 3,923,568 A | 12/1975 | Bersin |
| 3,989,347 A | 11/1976 | Eschler |
| 4,282,436 A | 8/1981 | Kapetanakos |
| 4,482,779 A | 11/1984 | Anderson |

(Continued)

FOREIGN PATENT DOCUMENTS

EP      0237559      12/1991

(Continued)

OTHER PUBLICATIONS

"Array of Nanoklystrons for Frequency Agility or Redundancy," NASA's Jet Propulsion Laboratory, NASA Tech Briefs, NPO-21033. 2001.

(Continued)

*Primary Examiner*—Douglas W. Owens
*Assistant Examiner*—Jimmy T Vu
(74) *Attorney, Agent, or Firm*—Davidson Berquist Jackson & Gowdey LLP

(57) ABSTRACT

A focal plane array electromagnetic radiation detector includes an array of micro-electromagnetic resonant detector cells. Each micro-electromagnetic resonant detector cell may include an ultra-small resonant structure for receiving an electromagnetic wave and adapted to angularly modulate a charged particle beam in response to receiving an electromagnetic wave. Each micro-electromagnetic detector cell may include a detector portion that measures the angular modulation of the charged particle beam. The ultra-small resonant structure is designed to angularly modulate the charged particle beam according to a characteristic of the received electromagnetic wave.

12 Claims, 3 Drawing Sheets

U.S. PATENT DOCUMENTS

| | | | |
|---|---|---|---|
| 4,712,042 A | 12/1987 | Hamm | |
| 4,713,581 A | 12/1987 | Haimson | |
| 4,727,550 A | 2/1988 | Chang et al. | |
| 4,740,973 A | 4/1988 | Madey | |
| 4,746,201 A | 5/1988 | Gould | |
| 4,829,527 A | 5/1989 | Wortman et al. | |
| 4,838,021 A | 6/1989 | Beattie | |
| 4,864,131 A | 9/1989 | Rich et al. | |
| 5,023,563 A | 6/1991 | Harvey et al. | |
| 5,113,141 A | 5/1992 | Swenson | |
| 5,128,729 A | 7/1992 | Alonas et al. | |
| 5,157,000 A | 10/1992 | Elkind et al. | |
| 5,163,118 A | 11/1992 | Lorenzo et al. | |
| 5,185,073 A | 2/1993 | Bindra | |
| 5,199,918 A | 4/1993 | Kumar | |
| 5,235,248 A | 8/1993 | Clark et al. | |
| 5,262,656 A | 11/1993 | Blondeau et al. | |
| 5,263,043 A | 11/1993 | Walsh | |
| 5,268,693 A | 12/1993 | Walsh | |
| 5,268,788 A | 12/1993 | Fox et al. | |
| 5,302,240 A | 4/1994 | Hori et al. | |
| 5,354,709 A | 10/1994 | Lorenzo et al. | |
| 5,446,814 A | 8/1995 | Kuo et al. | |
| 5,504,341 A | 4/1996 | Glavish | |
| 5,578,909 A | 11/1996 | Billen | |
| 5,608,263 A | 3/1997 | Drayton et al. | |
| 5,666,020 A | 9/1997 | Takemura | |
| 5,668,368 A | 9/1997 | Sakai et al. | |
| 5,705,443 A | 1/1998 | Stauf et al. | |
| 5,737,458 A | 4/1998 | Wojnarowski et al. | |
| 5,744,919 A | 4/1998 | Mishin et al. | |
| 5,757,009 A | 5/1998 | Walstrom | |
| 5,767,013 A | 6/1998 | Park | |
| 5,790,585 A | 8/1998 | Walsh | |
| 5,811,943 A | 9/1998 | Mishin et al. | |
| 5,821,836 A | 10/1998 | Katehi et al. | |
| 5,821,902 A | 10/1998 | Keen | |
| 5,825,140 A | 10/1998 | Fujisawa | |
| 5,831,270 A | 11/1998 | Nakasuji | |
| 5,847,745 A | 12/1998 | Shimizu et al. | |
| 5,858,799 A * | 1/1999 | Yee et al. | 436/164 |
| 5,889,449 A | 3/1999 | Fiedziuszko | |
| 5,902,489 A | 5/1999 | Yasuda et al. | |
| 6,008,496 A | 12/1999 | Winefordner et al. | |
| 6,040,625 A | 3/2000 | Ip | |
| 6,060,833 A | 5/2000 | Velazco | |
| 6,080,529 A | 6/2000 | Ye et al. | |
| 6,139,760 A | 10/2000 | Shim et al. | |
| 6,195,199 B1 | 2/2001 | Yamada | |
| 6,222,866 B1 | 4/2001 | Seko | |
| 6,278,239 B1 | 8/2001 | Caporaso et al. | |
| 6,281,769 B1 | 8/2001 | Fiedziuszko | |
| 6,297,511 B1 | 10/2001 | Syllaios et al. | |
| 6,316,876 B1 | 11/2001 | Tanabe | |
| 6,338,968 B1 | 1/2002 | Hefti | |
| 6,370,306 B1 | 4/2002 | Sato et al. | |
| 6,373,194 B1 | 4/2002 | Small | |
| 6,376,258 B2 | 4/2002 | Hefti | |
| 6,407,516 B1 | 6/2002 | Victor | |
| 6,441,298 B1 | 8/2002 | Thio | |
| 6,453,087 B2 | 9/2002 | Frish et al. | |
| 6,470,198 B1 | 10/2002 | Kintaka et al. | |
| 6,504,303 B2 | 1/2003 | Small | |
| 6,525,477 B2 | 2/2003 | Small | |
| 6,545,425 B2 | 4/2003 | Victor | |
| 6,577,040 B2 | 6/2003 | Nguyen | |
| 6,603,915 B2 | 8/2003 | Glebov et al. | |
| 6,624,916 B1 | 9/2003 | Green et al. | |
| 6,636,653 B2 | 10/2003 | Miracky et al. | |
| 6,640,023 B2 | 10/2003 | Miller et al. | |
| 6,642,907 B2 | 11/2003 | Hamada et al. | |
| 6,738,176 B2 | 5/2004 | Rabinowitz et al. | |
| 6,741,781 B2 | 5/2004 | Furuyama | |
| 6,777,244 B2 * | 8/2004 | Pepper et al. | 436/165 |
| 6,782,205 B2 | 8/2004 | Trisnadi et al. | |
| 6,791,438 B2 | 9/2004 | Takahashi et al. | |
| 6,829,286 B1 | 12/2004 | Guilfoyle et al. | |
| 6,834,152 B2 | 12/2004 | Gunn et al. | |
| 6,870,438 B1 | 3/2005 | Shino et al. | |
| 6,885,262 B2 | 4/2005 | Nishimura et al. | |
| 6,909,092 B2 | 6/2005 | Nagahama | |
| 6,909,104 B1 | 6/2005 | Koops | |
| 6,943,650 B2 | 9/2005 | Ramprasad et al. | |
| 6,944,369 B2 | 9/2005 | Deliwala | |
| 6,953,291 B2 | 10/2005 | Liu | |
| 6,954,515 B2 | 10/2005 | Bjorkholm et al. | |
| 6,965,284 B2 | 11/2005 | Maekawa et al. | |
| 6,965,625 B2 | 11/2005 | Mross et al. | |
| 6,972,439 B1 | 12/2005 | Kim et al. | |
| 6,995,406 B2 | 2/2006 | Tojo et al. | |
| 7,010,183 B2 | 3/2006 | Estes et al. | |
| 7,092,588 B2 | 8/2006 | Kondo | |
| 7,092,603 B2 | 8/2006 | Glebov et al. | |
| 7,122,978 B2 | 10/2006 | Nakanishi et al. | |
| 7,177,515 B2 | 2/2007 | Estes et al. | |
| 7,230,201 B1 | 6/2007 | Miley et al. | |
| 7,267,459 B2 | 9/2007 | Matheson | |
| 7,267,461 B2 | 9/2007 | Kan et al. | |
| 7,342,441 B2 | 3/2008 | Gorrell et al. | |
| 2001/0025925 A1 | 10/2001 | Abe et al. | |
| 2002/0009723 A1 | 1/2002 | Hefti | |
| 2002/0027481 A1 | 3/2002 | Fiedziuszko | |
| 2002/0036121 A1 | 3/2002 | Ball et al. | |
| 2002/0036264 A1 | 3/2002 | Nakasuji et al. | |
| 2002/0053638 A1 | 5/2002 | Winkler et al. | |
| 2002/0070671 A1 | 6/2002 | Small | |
| 2002/0071457 A1 | 6/2002 | Hogan | |
| 2002/0135665 A1 | 9/2002 | Gardner | |
| 2003/0012925 A1 | 1/2003 | Gorrell | |
| 2003/0016412 A1 | 1/2003 | Small | |
| 2003/0016421 A1 | 1/2003 | Small | |
| 2003/0034535 A1 | 2/2003 | Barenburu et al. | |
| 2003/0155521 A1 | 8/2003 | Feuerbaum | |
| 2003/0158474 A1 | 8/2003 | Scherer et al. | |
| 2003/0164947 A1 | 9/2003 | Vaupel | |
| 2003/0179974 A1 | 9/2003 | Estes et al. | |
| 2003/0206708 A1 | 11/2003 | Estes et al. | |
| 2003/0214695 A1 | 11/2003 | Abramson et al. | |
| 2004/0061053 A1 | 4/2004 | Taniguchi et al. | |
| 2004/0085159 A1 | 5/2004 | Kubena et al. | |
| 2004/0108473 A1 | 6/2004 | Melnychuk et al. | |
| 2004/0136715 A1 | 7/2004 | Kondo | |
| 2004/0150991 A1 | 8/2004 | Ouderkirk et al. | |
| 2004/0171272 A1 | 9/2004 | Jin et al. | |
| 2004/0180244 A1 | 9/2004 | Tour et al. | |
| 2004/0184270 A1 | 9/2004 | Halter | |
| 2004/0213375 A1 | 10/2004 | Bjorkholm et al. | |
| 2004/0217297 A1 | 11/2004 | Moses et al. | |
| 2004/0231996 A1 | 11/2004 | Webb | |
| 2004/0240035 A1 | 12/2004 | Zhilkov | |
| 2004/0264867 A1 | 12/2004 | Kondo | |
| 2005/0023145 A1 | 2/2005 | Cohen et al. | |
| 2005/0045821 A1 | 3/2005 | Noji et al. | |
| 2005/0045832 A1 | 3/2005 | Kelly et al. | |
| 2005/0054151 A1 | 3/2005 | Lowther et al. | |
| 2005/0067286 A1 | 3/2005 | Ahn et al. | |
| 2005/0082469 A1 | 4/2005 | Carlo | |
| 2005/0092929 A1 | 5/2005 | Schneiker | |
| 2005/0105690 A1 | 5/2005 | Pau et al. | |
| 2005/0145882 A1 | 7/2005 | Taylor et al. | |
| 2005/0162104 A1 | 7/2005 | Victor et al. | |
| 2005/0179879 A1 * | 8/2005 | Pril | 355/50 |
| 2005/0190637 A1 | 9/2005 | Ichimura et al. | |
| 2005/0194258 A1 | 9/2005 | Cohen et al. | |

| | | |
|---|---|---|
| 2005/0201707 A1 | 9/2005 | Glebov et al. |
| 2005/0201717 A1 | 9/2005 | Matsumura et al. |
| 2005/0212503 A1 | 9/2005 | Deibele |
| 2005/0231138 A1 | 10/2005 | Nakanishi et al. |
| 2005/0249451 A1 | 11/2005 | Baehr-Jones et al. |
| 2005/0285541 A1 | 12/2005 | LeChevalier |
| 2006/0007730 A1 | 1/2006 | Nakamura et al. |
| 2006/0018619 A1 | 1/2006 | Helffrich et al. |
| 2006/0035173 A1 | 2/2006 | Davidson et al. |
| 2006/0045418 A1 | 3/2006 | Cho et al. |
| 2006/0060782 A1 | 3/2006 | Khursheed |
| 2006/0062258 A1 | 3/2006 | Brau et al. |
| 2006/0159131 A1 | 7/2006 | Liu et al. |
| 2006/0164496 A1 | 7/2006 | Tokutake et al. |
| 2006/0208667 A1 | 9/2006 | Lys et al. |
| 2006/0216940 A1 | 9/2006 | Gorrell et al. |
| 2006/0243925 A1 | 11/2006 | Barker et al. |
| 2006/0274922 A1 | 12/2006 | Ragsdale |
| 2007/0003781 A1 | 1/2007 | de Rochemont |
| 2007/0013765 A1 | 1/2007 | Hudson et al. |
| 2007/0075264 A1 | 4/2007 | Gorrell et al. |
| 2007/0086915 A1 | 4/2007 | LeBoeuf et al. |
| 2007/0116420 A1 | 5/2007 | Estes et al. |
| 2007/0284527 A1 | 12/2007 | Zani et al. |

FOREIGN PATENT DOCUMENTS

| | | |
|---|---|---|
| JP | 2004-32323 A | 1/2004 |
| WO | WO 87/01873 | 3/1987 |
| WO | WO 93/21663 A1 | 10/1993 |
| WO | WO 00/72413 | 11/2000 |
| WO | WO 02/025785 | 3/2002 |
| WO | WO 02/077607 | 10/2002 |
| WO | WO 2004/086560 | 10/2004 |
| WO | WO 2005/015143 A2 | 2/2005 |
| WO | WO 2006/042239 A2 | 4/2006 |
| WO | WO 2007/081389 | 7/2007 |
| WO | WO 2007/081390 | 7/2007 |
| WO | WO 2007/081391 | 7/2007 |

OTHER PUBLICATIONS

"Hardware Development Programs," Calabazas Creek Research, Inc. found at http://calcreek.com/hardware.html. 1994.
"Antenna Arrays." May 18, 2002. www.tpub.com/content/neets/14183/css/14183_159.htm.
"Diffraction Grating," hyperphysics.phy-astr.gsu.edu/hbase/phyopt/grating.html. 2005.
Alford, T.L. et al., "Advanced silver-based metallization patterning for ULSI applications," Microelectronic Engineering 55, 2001, pp. 383-388, Elsevier Science B.V.
Amato, Ivan, "An Everyman's Free-Electron Laser?" Science, New Series, Oct. 16, 1992, p. 401, vol. 258 No. 5081, American Association for the Advancement of Science.
Andrews, H.L. et al., "Dispersion and Attenuation in a Smith-Purcell Free Electron Laser," The American Physical Society, Physical Review Special Topics—Accelerators and Beams 8 (2005), pp. 050703-1-050703-9.
Backe, H . et al. "Investigation of Far-Infrared Smith-Purcell Radiation at the 3.41 MeV Electron Injector Linac of the Mainz Microtron MAMI," Institut fur Kernphysik, Universitat Mainz, D-55099, Mainz Germany. (No date available).
Bakhtyari, A. et al., "Horn Resonator Boosts Miniature Free-Electron Laser Power," Applied Physics Letters, May 12, 2003, pp. 3150-3152, vol. 82, No. 19, American Institute of Physics.
Bakhtyari, Dr. Arash, "Gain Mechanism in a Smith-Purcell MicroFEL," Abstract, Department of Physics and Astronomy, Dartmouth College. (No date available).
Bhattacharjee, Sudeep et al., "Folded Waveguide Traveling-Wave Tube Sources for Terahertz Radiation." IEEE Transactions on Plasma Science, vol. 32, No. 3, Jun. 2004, pp. 1002-1014.
Booske, J.H. et al., "Microfabricated TWTs as High Power, Wideband Sources of THz Radiation" (No date available).

Brau, C.A. et al., "Gain and Coherent Radiation from a Smith-Purcell Free Electron Laser," Proceedings of the 2004 FEL Conference, pp. 278-281.
Brownell, J.H. et al., "Improved µFEL Performance with Novel Resonator," Jan. 7, 2005, from website: www.frascati.enea.it/thz-bridge/workshop/presentations/Wednesday/WE-07-Brownell.ppt.
Brownell, J.H. et al., "The Angular Distribution of the Power Produced by Smith-Purcell Radiation," J. Phys. D: Appl. Phys. 1997, pp. 2478-2481, vol. 30, IOP Publishing Ltd., United Kingdom.
Chuang, S.L. et al., "Enhancement of Smith-Purcell Radiation from a Grating with Surface-Plasmon Excitation," Journal of the Optical Society of America, Jun. 1984, pp. 672-676, vol. 1 No. 6, Optical Society of America.
Chuang, S.L. et al., "Smith-Purcell Radiation from a Charge Moving Above a Penetrable Grating," IEEE MTT-S Digest, 1983, pp. 405-406, IEEE.
Far-IR, Sub-MM & MM Detector Technology Workshop list of manuscripts, session 6 202.
Feltz, W.F. et al., "Near-Continuous Profiling of Temperature, Moisture, and Atmospheric Stability Using the Atmospheric Emitted Radiance Interferometer (AERI)," Journal of Applied Meteorology, May 2003, vol. 42 No. 5, H.W. Wilson Company, pp. 584-597.
Freund, H.P. et al., "Linearized Field Theory of a Smith-Purcell Traveling Wave Tube," IEEE Transactions on Plasma Science, Jun. 2004, pp. 1015-1027, vol. 32 No. 3, IEEE.
Gallerano, G.P. et al., "Overview of Terahertz Radiation Sources," Proceedings of the 2004 FEL Conference, pp. 216-221.
Goldstein, M. et al., "Demonstration of a Micro Far-Infrared Smith-Purcell Emitter," Applied Physics Letters, Jul. 28, 1997, pp. 452-454, vol. 71 No. 4, American Institute of Physics.
Gover, A. et al., "Angular Radiation Pattern of Smith-Purcell Radiation," Journal of the Optical Society of America, Oct. 1984, pp. 723-728, vol. 1 No. 5, Optical Society of America.
Grishin, Yu. A. et al., "Pulsed Orotron—A New Microwave Source for Submillimeter Pulse High-Field Electron Paramagnetic Resonance Spectroscopy," Review of Scientific Instruments, Sep. 2004, pp. 2926-2936, vol. 75 No. 9, American Institute of Physics.
Ishizuka, H. et al., "Smith-Purcell Experiment Utilizing a Field-Emitter Array Cathode: Measurements of Radiation," Nuclear Instruments and Methods in Physics Research, 2001, pp. 593-598, A 475, Elsevier Science B.V.
Ishizuka, H. et al., "Smith-Purcell Radiation Experiment Using a Field-Emission Array Cathode," Nuclear Instruments and Methods in Physics Research, 2000, pp. 276-280, A 445, Elsevier Science B.V.
Ives, Lawrence et al., "Development of Backward Wave Oscillators for Terahertz Applications," Terahertz for Military and Security Applications, Proceedings of SPIE vol. 5070 (2003), pp. 71-82.
Ives, R. Lawrence, "IVEC Summary, Session 2, Sources I" 2002.
Jonietz, Erika, "Nano Antenna Gold nanospheres show path to all-optical computing," Technology Review, Dec. 2005/ Jan. 2006, p. 32.
Joo, Youngcheol et al., "Air Cooling of IC Chip with Novel Microchannels Monolithically Formed on Chip Front Surface," Cooling and Thermal Design of Electronic Systems (HTD-vol. 319 & EEP-vol. 15), International Mechanical Engineering Congress and Exposition, San Francisco, CA Nov. 1995 pp. 117-121.
Joo, Youngcheol et al., "Fabrication of Monolithic Microchannels for IC Chip Cooling," 1995, Mechanical, Aerospace and Nuclear Engineering Department, University of California at Los Angeles.
Jung, K.B. et al., "Patterning of Cu, Co, Fe, and Ag for magnetic nanostructures," J. Vac. Sci. Technol. A 15(3), May/Jun. 1997, pp. 1780-1784.
Kapp, Oscar H. et al., "Modification of a Scanning Electron Microscope to Produce Smith-Purcell Radiation," Review of Scientific Instruments, Nov. 2004, pp. 4732-4741, vol. 75 No. 11, American Institute of Physics.
Kiener, C. et al., "Investigation of the Mean Free Path of Hot Electrons in GaAs/AlGaAs Heterostructures," Semicond. Sci. Technol., 1994, pp. 193-197, vol. 9, IOP Publishing Ltd., United Kingdom.
Kim, Shang Hoon, "Quantum Mechanical Theory of Free-Electron Two-Quantum Stark Emission Driven by Transverse Motion," Journal of the Physical Society of Japan, Aug. 1993, vol. 62 No. 8, pp. 2528-2532.

Korbly, S.E. et al., "Progress on Smith-Purcell Radiation Bunch Length Diagnostic," Plasma Science and Fusion Center, MIT, Cambridge, MA (No date available).

Kormann, T. et al., "A Photoelectron Source for the Study of Smith-Purcell Radiation" (No date available).

Kube, G. et al., "Observation of Optical Smith-Purcell Radiation at an Electron Beam Energy of 855 MeV," Physical Review E, May 8, 2002, vol. 65, The American Physical Society, pp. 056501-1-056501-15.

Liu, Chuan Sheng, et al., "Stimulated Coherent Smith-Purcell Radiation from a Metallic Grating," IEEE Journal of Quantum Electronics, Oct. 1999, pp. 1386-1389, vol. 35, No. 10, IEEE.

Manohara, Harish et al., "Field Emission Testing of Carbon Nanotubes for THz Frequency Vacuum Microtube Sources." Abstract. Dec. 2003. from SPIEWeb.

Manohara, Harish M. et al., "Design and Fabrication of a THz Nanoklystron" (No date available).

Manohara, Harish M. et al., "Design and Fabrication of a THz Nanoklystron" (www.sofia.usra.edu/det_workshop/ posters/session 3/3-43manohara_poster.pdf), PowerPoint Presentation (No date available).

McDaniel, James C. et al., "Smith-Purcell Radiation in the High Conductivity and Plasma Frequency Limits," Applied Optics, Nov. 15, 1989, pp. 4924-4929, vol. 28 No. 22, Optical Society of America.

Meyer, Stephan, "Far IR, Sub-MM & MM Detector Technology Workshop Summary," Oct. 2002. (may date the Manohara documents).

Mokhoff, Nicolas, "Optical-speed light detector promises fast space talk," EETimes Online, Mar. 20, 2006, from website: www.eetimes.com/showArticle.jhtml?articleID=183701047.

Nguyen, Phucanh et al., "Novel technique to pattern silver using CF4 and CF4/O2 glow discharges." J.Vac. Sci. Technol. B 19(1), Jan./Feb. 2001, American Vacuum Society, pp. 158-165.

Nguyen, Phucanh et al., "Reactive ion etch of patterned and blanket silver thin films in CI2/O2 and O2 glow discharges," J. Vac. Sci, Technol. B. 17 (5), Sep./Oct. 1999, American Vacuum Society, pp. 2204-2209.

Ohtaka, Kazuo, "Smith-Purcell Radiation from Metallic and Dielectric Photonic Crystals," Center for Frontier Science, pp. 272-273, Chiba University, 1-33 Yayoi, Inage-ku, Chiba-shi, Japan. (No date available).

Photonics Research, "Surface-Plasmon-Enhanced Random Laser Demonstrated," Photonics Spectra, Feb. 2005, pp. 112-113.

Platt, C.L. et al., "A New Resonator Design for Smith-Purcell Free Electron Lasers," 6Q19, p. 296. (No date available).

Potylitsin, A.P., "Resonant Diffraction Radiation and Smith-Purcell Effect," (Abstract), arXiv: physics/9803043 v2 Apr. 13, 1998.

Potylitsyn, A.P., "Resonant Diffraction Radiation and Smith-Purcell Effect," Physics Letters A, Feb. 2, 1998, pp. 112-116, A 238, Elsevier Science B.V.

S. Hoogland et al., "A solution-processed 1.53 µm quantum dot laser with temperature-invariant emission wavelength," Optics Express, vol. 14, No. 8, Apr. 17, 2006, pp. 3273-3281.

Savilov, Andrey V., "Stimulated Wave Scattering in the Smith-Purcell FEL," IEEE Transactions on Plasma Science, Oct. 2001, pp. 820-823, vol. 29 No. 5, IEEE.

Schachter, Levi et al., "Smith-Purcell Oscillator in an Exponential Gain Regime," Journal of Applied Physics, Apr. 15, 1989, pp. 3267-3269, vol. 65 No. 8, American Institute of Physics.

Schachter, Levi, "Influence of the Guiding Magnetic Field on the Performance of a Smith-Purcell Amplifier Operating in the Weak Compton Regime," Journal of the Optical Society of America, May 1990, pp. 873-876, vol 7 No. 5, Optical Society of America.

Schachter, Levi, "The Influence of the Guided Magnetic Field on the Performance of a Smith-Purcell Amplifier Operating in the Strong Compton Regime," Journal of Applied Physics, Apr. 15, 1990, pp. 3582-3592, vol. 67 No. 8, American Institute of Physics.

Shih, I. et al., "Experimental Investigations of Smith-Purcell Radiation," Journal of the Optical Society of America, Mar. 1990, pp. 351-356, vol. 7, No. 3, Optical Society of America.

Shih, I. et al., "Measurements of Smith-Purcell Radiation," Journal of the Optical Society of America, Mar. 1990, pp. 345-350, vol. 7 No. 3, Optical Society of America.

Swartz, J.C. et al., "THz-FIR Grating Coupled Radiation Source," Plasma Science, 1998. 1D02, p. 126.

Temkin, Richard, "Scanning with Ease Through the Far Infrared," Science, New Series, May 8, 1998, p. 854, vol. 280, No. 5365, American Association for the Advancement of Science.

Walsh, J.E., et al., 1999. From website: http://www.ieee.org/organizations/pubs/newsletters/leos/feb99/hot2.htm.

Wentworth, Stuart M. et al., "Far-Infrared Composite Microbolometers," IEEE MTT-S Digest, 1990, pp. 1309-1310.

Yamamoto, N. et al., "Photon Emission From Silver Particles Induced by a High-Energy Electron Beam," Physical Review B, Nov. 6, 2001, pp. 205419-1-205419-9, vol. 64, The American Physical Society.

Yokoo, K. et al., "Smith-Purcell Radiation at Optical Wavelength Using a Field-Emitter Array," Technical Digest of IVMC, 2003, pp. 77-78.

Zeng, Yuxiao et al., "Processing and encapsulation of silver patterns by using reactive ion etch and ammonia anneal," Materials Chemistry and Physics 66, 2000, pp. 77-82.

International Search Report and Written Opinion mailed Nov. 23, 2007 in International Application No. PCT/US2006/022786.

Search Report and Written Opinion mailed Oct. 25, 2007 in PCT Appln. No. PCT/US2006/022687.

Search Report and Written Opinion mailed Oct. 26, 2007 in PCT Appln. No. PCT/US2006/022675.

Search Report and Written Opinion mailed Sep. 21, 2007 in PCT Appln. No. PCT/US2006/022688.

Search Report and Written Opinion mailed Sep. 25, 2007 in PCT appln. No. PCT/US2006/022681.

Search Report and Written Opinion mailed Sep. 26, 2007 in PCT Appln. No. PCT/US2006/024218.

Search Report and Written Opinion mailed Aug. 24, 2007 in PCT Appln. No. PCT/US2006/022768.

Search Report and Written Opinion mailed Aug. 31, 2007 in PCT Appln. No. PCT/US2006/022680.

Search Report and Written Opinion mailed Jul. 16, 2007 in PCT Appln. No. PCT/US2006/022774.

Search Report and Written Opinion mailed Jul. 20, 2007 in PCT Appln. No. PCT/US2006/024216.

Search Report and Written Opinion mailed Jul. 26, 2007 in PCT Appln. No. PCT/US2006/022776.

Search Report and Written Opinion mailed Jun. 20, 2007 in PCT Appln. No. PCT/US2006/022779.

Search Report and Written Opinion mailed Sep. 12, 2007 in PCT Appln. No. PCT/US2006/022767.

Search Report and Written Opinion mailed Sep. 13, 2007 in PCT Appln. No. PCT/US2006/024217.

Search Report and Written Opinion mailed Sep. 17, 2007 in PCT Appln. No. PCT/US2006/022787.

Search Report and Written Opinion mailed Sep. 5, 2007 in PCT Appln. No. PCT/US2006/027428.

Search Report and Written Opinion mailed Sep. 17, 2007 in PCT Appln. No. PCT/US2006/022689.

Lee Kwang-Cheol et al., "Deep X-Ray Mask with Integrated Actuator for 3D Microfabrication", Conference: Pacific Rim Workshop on Transducers and Micro/Nano Technologies, (Xiamen CHN), Jul. 22, 2002.

Markoff, John, "A Chip That Can Transfer Data Using Laser Light," The New York Times, Sep. 18, 2006.

S.M. Sze, "Semiconductor Devices Physics and Technology", 2nd Edition, Chapters 9 and 12, Copyright 1985, 2002.

Search Report and Written Opinion mailed Feb. 12, 2007 in PCT Appln. No. PCT/US2006/022682.

Search Report and Written Opinion mailed Feb. 20, 2007 in PCT Appln. No. PCT/US2006/022676.

Search Report and Written Opinion mailed Feb. 20, 2007 in PCT Appln. No. PCT/US2006/022772.

Search Report and Written Opinion mailed Feb. 20, 2007 in PCT Appln. No. PCT/US2006/022780.

Search Report and Written Opinion mailed Feb. 21, 2007 in PCT Appln. No. PCT/US2006/022684.

Search Report and Written Opinion mailed Jan. 17, 2007 in PCT Appln. No. PCT/US2006/022777.

Search Report and Written Opinion mailed Jan. 23, 2007 in PCT Appln. No. PCT/US2006/022781.

Search Report and Written Opinion mailed Mar. 7, 2007 in PCT Appln. No. PCT/US2006/022775.

Speller et al., "A Low-Noise MEMS Accelerometer for Unattended Ground Sensor Applications", Applied MEMS Inc., 12200 Parc Crest, Stafford TX, USA 77477 (No date available).

Thurn-Albrecht et al., "Ultrahigh-Density Nanowire Arrays Grown in Self-Assembled Diblock Copolymer Templates", Science 290. 5499, Dec. 15, 2000, pp. 2126-2129.

U.S. Appl. No. 11/418,082, filed May 5, 2006, Gorrell et al.

J. C. Palais, "Fiber optic communications," Prentice Hall, New Jersey, 1998, pp. 156-158.

Search Report and Written Opinion mailed Dec. 20, 2007 in PCT Appln. No. PCT/US2006/022771.

Search Report and Written Opinion mailed Jan. 31, 2008 in PCT Appln. No. PCT/US2006/027427.

Search Report and Written Opinion mailed Jan. 8, 2008 in PCT Appln. No. PCT/US2006/028741.

Search Report and Written Opinion mailed Mar. 11, 2008 in PCT Appln. No. PCT/US2006/022679.

Search Report and Written Opinion mailed Apr. 23, 2008 in PCT Appln. No. PCT/US2006/022678.

Search Report and Written Opinion mailed Apr. 3, 2008 in PCT Appln. No. PCT/US2006/027429.

Search Report and Written Opinion mailed Jun. 18, 2008 in PCT Appln. No. PCT/US2006/027430.

Search Report and Written Opinion mailed Jun. 3, 2008 in PCT Appln. No. PCT/US2006/022783.

Search Report and Written Opinion mailed Mar. 24, 2008 in PCT Appln. No. PCT/US2006/022677.

Search Report and Written Opinion mailed Mar. 24, 2008 in PCT Appln. No. PCT/US2006/022784.

Search Report and Written Opinion mailed May 2, 2008 in PCT Appln. No. PCT/US2006/023280.

Search Report and Written Opinion mailed May 21, 2008 in PCT Appln. No. PCT/US2006/023279.

Search Report and Written Opinion mailed May 22, 2008 in PCT Appln. No. PCT/US2006/022685.

* cited by examiner

FOCAL PLANE ARRAY INCORPORATING ULTRA-SMALL RESONANT STRUCTURES

COPYRIGHT NOTICE

A portion of the disclosure of this patent document contains material which is subject to copyright or mask work protection. The copyright or mask work owner has no objection to the facsimile reproduction by anyone of the patent document or the patent disclosure, as it appears in the Patent and Trademark Office patent file or records, but otherwise reserves all copyright or mask work rights whatsoever.

CROSS-REFERENCE TO RELATED APPLICATIONS

The present invention is related to the following co-pending U.S. patent applications which are all commonly owned with the present application, the entire contents of each of which are incorporated herein by reference:
1. U.S. application Ser. No. 11/302,471, entitled "Coupled Nano-Resonating Energy Emitting Structures," filed Dec. 14, 2005,
2. U.S. application Ser. No. 11/349,963, entitled "Method And Structure For Coupling Two Microcircuits," filed Feb. 9, 2006;
3. U.S. patent application Ser. No. 11/238,991, filed Sep. 30, 2005, entitled "Ultra-Small Resonating Charged Particle Beam Modulator";
4. U.S. patent application Ser. No. 10/917,511, filed on Aug. 13, 2004, entitled "Patterning Thin Metal Film by Dry Reactive Ion Etching";
5. U.S. application Ser. No. 11/203,407, filed on Aug. 15, 2005, entitled "Method Of Patterning Ultra-Small Structures";
6. U.S. application Ser. No. 11/243,476, filed on Oct. 5, 2005, entitled "Structures And Methods For Coupling Energy From An Electromagnetic Wave";
7. U.S. application Ser. No. 11/243,477, filed on Oct. 5, 2005, entitled "Electron beam induced resonance,"
8. U.S. application Ser. No. 11/325,448, entitled "Selectable Frequency Light Emitter from Single Metal Layer," filed Jan. 5, 2006;
9. U.S. application Ser. No. 11/325,432, entitled, "Matrix Array Display," filed Jan. 5, 2006,
10. U.S. patent application Ser. No. 11/400,280, titled "Resonant Detector for Optical Signals," filed Apr. 10, 2006.

FIELD OF THE DISCLOSURE

This relates to micro-electromagnetic resonant detectors, and, more particularly, to using such devices in focal plane arrays.

Glossary

Ultra-small resonant structure: any structure of any material, type or microscopic size that by its characteristics causes electrons to resonate at a frequency in excess of the microwave frequency.

Micro-electromagnetic resonant detector cell: detects electromagnetic radiation by angularly modulating a beam of charged particles and comprises at least a charged particle source, at least one detector and at least one ultra-small resonant structure.

INTRODUCTION & BACKGROUND

A focal plane array (FPA) is a matrix of detector cells. FPAs are frequently connected to or built on a semiconductor chip. FPA detector cells are composed of materials that are responsive to particular frequencies of electromagnetic radiation (EMR). The particular frequencies the detector cells are responsive to depends on the application. The response of all the detector cells in the array can be combined to form a composite image. One of the most common imaging application is digital photography, i.e. generating an image from detector cells that are responsive to frequencies in the visible light range. However, there is a growing market for devices that create images from detector cells that are responsive to a variety of electromagnetic frequencies including those not in the visible light spectrum.

Microbolometers have FPAs consisting of detector cells made from materials that produce a change in electrical resistivity in accordance with a temperature change i.e. a change in infrared radiation. Commercially available microbolometers have FPAs with a resolution of 320×240 and a response speed of 30 fps. Micrcobolometers are an uncooled type of bolometer as opposed to a cooled type which typically requires cryogenic cooling to minimize noise. Cooled sensors offer greater sensitivity, but are more expensive because of the cost required to cool them. Furthermore, mircobolometers are limited by their response speed. Thus, it is desirable to produce a microbolometer type device with increased sensitivity and a better response speed, but without the added costs of temperature controls.

The more specific aspects of the various other focal point arrays and the various other devices which employ them are known to the artisan and for brevity will not be repeated herein.

U.S. patent application Ser. No. 11/400,280, noted above describes various arrangements of ultra-small resonant structures that can be used to angularly modulate a beam of charged particles directed past them, when exposed to incoming or received EMR. The ultra-small structure(s) may comprise, for instance, any number of nano-sized resonant structures constructed and adapted to angularly modulate a beam of charged particles in responses to observed electromagnetic waves such that EMR can be detected e.g., as described above and/or in U.S. patent applications Ser. Nos. 11/243,476; 11/400,280 (each described in greater detail above).

It is desirable to use one or more ultra-small resonant structures or arrays thereof, to create a FPA for use in imaging applications, in particular mircobolometery.

BRIEF DESCRIPTION OF THE DRAWINGS

The following description, given with respect to the attached drawings, may be better understood with reference to the non-limiting examples of the drawing, wherein the drawings show.

DESCRIPTION OF THE PRESENTLY PREFERRED EXEMPLARY EMBODIMENTS

Figure 1:
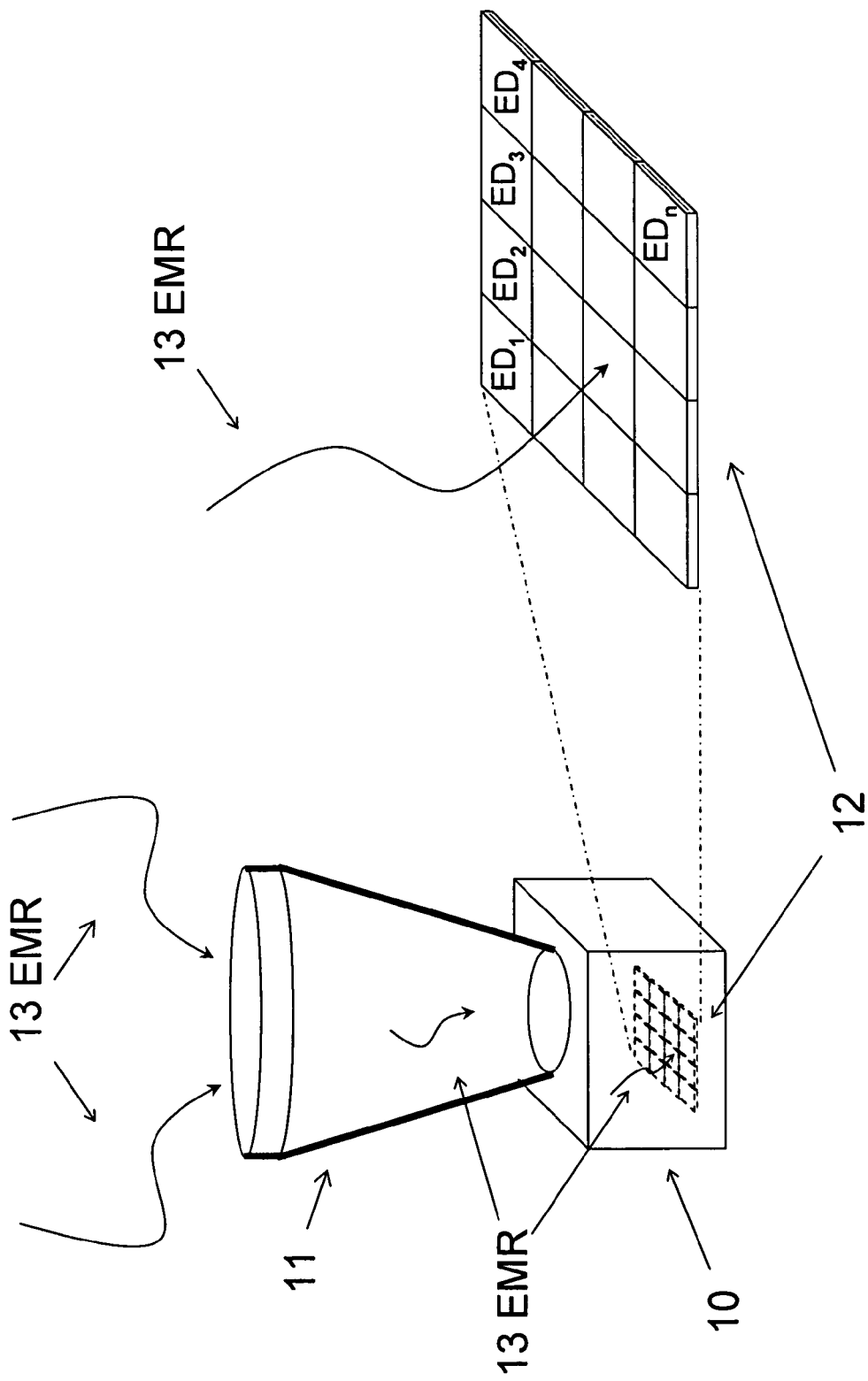
FIG. 1: Diagrammatically shows an imaging device.

As shown in FIG. 1, an imaging device 10 that includes a lens system 11 and at least one Focal Point Array (FPA) 12 comprised of a plurality of micro-electromagnetic resonant detector cells, where each micro-electromagnetic resonant detector cell is denoted as $ED_1$, $ED_2$ ... $ED_n$. An enlarged view of the surface of the FPA 12 is shown to the right of the imaging device 10. EMR 13 is focused through the lens system 11 and is absorbed by the surface of the FPA 12. The structure set forth in FIG. 1 is intended to be exemplary only and is not intended to limit the ways in which a FPA can or might absorb EMR 13. It should be noted, that the FPA 12 may be capable of moving within the housing of the imaging device 10 e.g. the FPA 12 may be capable of rotating about an axis or tilting about an axis.

Each detector cell $ED_1$-$ED_n$ includes a charged particle source, at least one detector and at least one ultra-small resonant structure. It should be noted that although the detectors cells $ED_n$s are shown to be rectangular in shape, this should not be viewed in any limiting way, but is used purely for exemplary purposes $ED_n$s could be other shapes (e.g. hexagons, etc.), or any combination of shapes, without departing from the scope of the present invention. Furthermore, although the $ED_n$s are shown with there faces on a single plane this is not intended to be limiting, the $ED_n$s may face different directions, e.g. the $ED_n$s may be orthogonal to each other.

Figure 2:
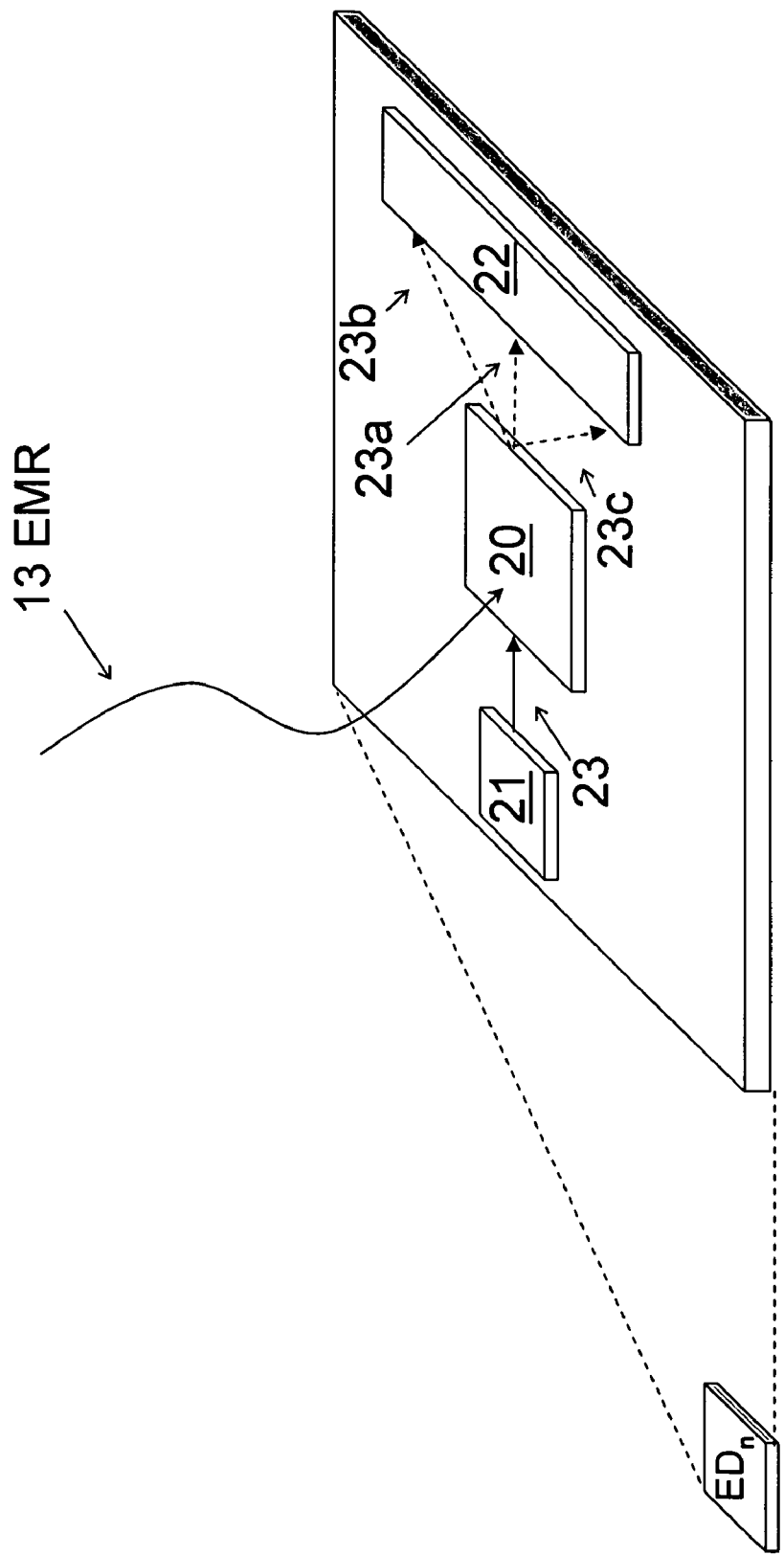
FIG. 2: Shows an enlarged diagrammatic view of a micro-electromagnetic radiation detector cell.

FIG. 2 shows an enlarged view of an exemplary detector cell $ED_n$ which includes a charged particle source 21 that generates a beam of charged particles 23, a detector 22, and an ultra-small resonant structure 20.

The details of detection are set forth in the above referenced U.S. patent application Ser. No. 11/400,280 and will not be repeated herein. However, in brief the charged particle source 21 generates the particle beam 23 that passes along or next to at least one ultra-small resonant structure 20. The particle beam 23 may comprise any type of charged particles (such as, e.g., positive ions, negative ions, electrons, protons and the like) and the charged particle source 21 may be any desired source of charged particles such as an ion gun, a thermionic filament, tungsten filament, a cathode, a vacuum triode, a planar vacuum triode, an electron-impact ionizer, a laser ionizer, a field emission cathode, a chemical ionizer, a thermal ionizer, an ion-impact ionizer, an electron source from a scanning electron microscope, etc.

With no incoming EMR being received, the charged particle beam 23 will simply pass by the ultra-small resonant structure to the center of the detector 22. However, the ultra-small resonant structures 20 will angularly modulate the charged particle beam 23 when they receive EMR 13. The ultra-small resonant structure 20 may be any of the ultra-small resonant structures disclosed in the related applications. In general, the structures have one physical dimension that is smaller than the wavelength of visible light.

As described in U.S. patent application Ser. No. 11/243,476 when the energy of an electromagnetic wave 13 is absorbed by an ultra-small resonant structure 20, the transfer causes plasmons on the ultra-small resonant structure 20 to resonate. The ability of an electromagnetic wave to induce the surface plasmons to resonate is described in one or more of the above applications including Ser. No. 11/400,280 and is not repeated herein.

The ultra-small resonant structures 20 will resonate in accordance with the characteristics of an incoming electromagnetic wave 13 (for example, intensity, frequency, polarization, etc.), such that the amplitude of the electric field in the ultra-small resonant structures bears a relation to a electromagnetic wave 13 characteristic. When the ultra-small resonant structures 20 resonate as a result of electromagnetic wave 13 being received the path of the particle beam 23 will be altered from its natural or normal path 23a. The amount the path of the particle beam 23a will be altered is related to the amplitude of the electrical field in the ultra-small resonant structures 20. Thus, the alteration of the particle beam from the normal or natural path 23a can be related to a characteristic of incoming electromagnetic wave 13. That is, the amplitude of a characteristic of an incoming electromagnetic wave 13 can be calculated by measuring the alteration of the particle beam path 23a. Exemplary altered paths of particle beams are shown as 23b and 23c, on both sides of 23a depending on the particular characteristics of electromagnetic wave 13.

As described in U.S. patent application Ser. No. 11/400,280, the detector 22 comprises charged particle absorption elements (e.g. receiving electrodes) that are placed at locations corresponding to altered paths 23b-23c and detector elements (e.g. differential current detector) that detect which particle absorption element absorbed particles from the particle beam 23 (i.e. to what extent was the particle beam 23 angularly modulated). Detector portions 22 typically comprise an absorption element that receives the unaltered particle beam 23a and a series of detector elements that receive various altered particle beams 23b-23c. Further details of detecting the deflected particle beam are disclosed in U.S. patent application Ser. No. 11/400,280 and will not be described herein. Alternative methods of detecting the deflected particle beam will be recognizable to the artisan who understands from this description the structure and purpose of the detector portion 22.

Figure 3:
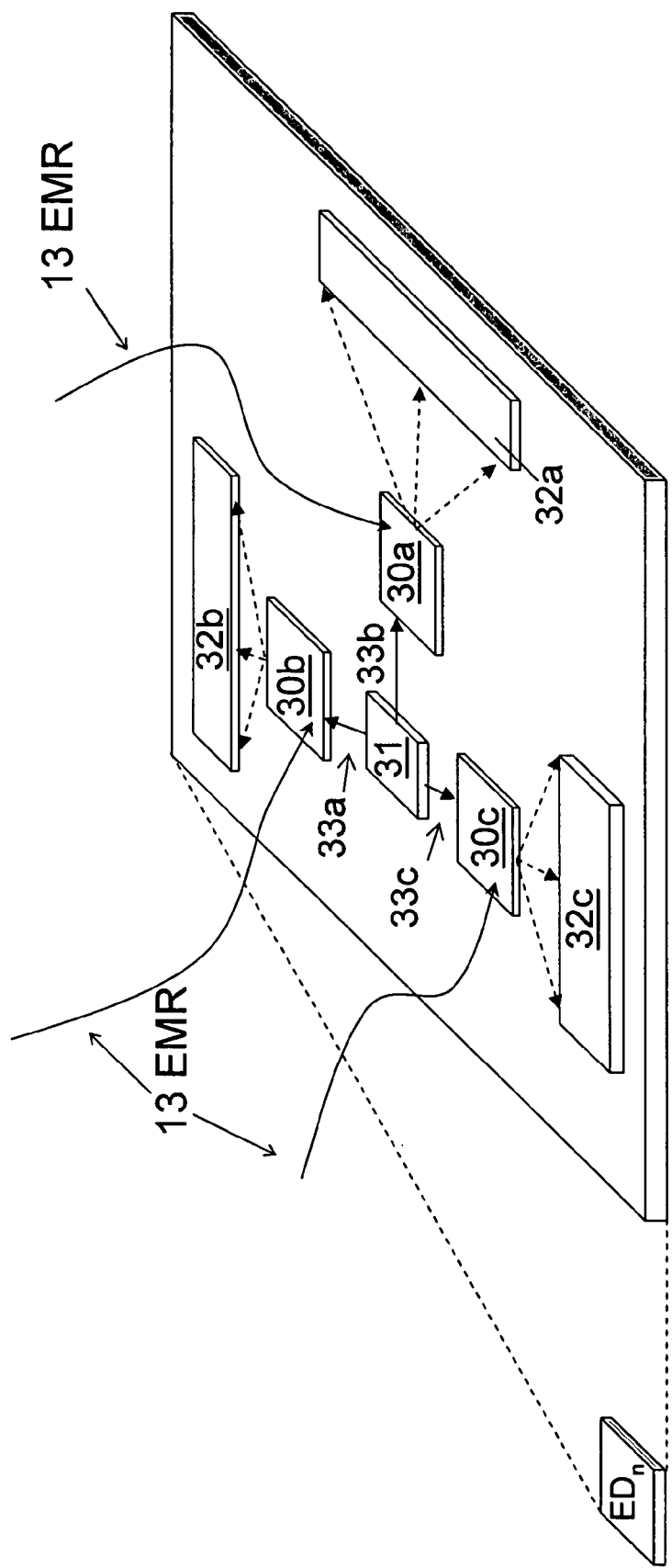
FIG. 3: Shows an enlarged diagrammatic view of an alternative micro-electromagnetic radiation detector cell.

FIG. 3 shows an enlarged view of an exemplary $ED_n$ with multiple detector portions 32a-c and multiple ultra-small resonant structures 30a-c. A single beam source 31 provides particle beams 33a-c to ultra-small resonant structures 30a-c. This may be accomplished by having a beam source 31 that is capable of providing particle beams 33a-c to ultra-small resonant structures 30a-c simultaneously via beam splitters, or the like, or by having a beam source 31 that provides particle beams 33a-c to each ultra-small resonant structure 30a-c at a different time. It should be noted that although FIG. 3 shows an $ED_n$ with three ultra-small resonant structures and three detectors this is not intended to be limiting. In fact, any number of ultra-small resonant structures and corresponding detectors could be incorporated into a detector cell, so long as each ultra-small resonant structure can angularly modulate a particle beam and a the corresponding detector can detect the modulation.

The $ED_n$ in FIG. 3 functions in a similar manner to the $ED_n$ described in accordance with FIG. 2, the difference being that it uses multiple detector portions 32a-c and multiple ultra-small resonant structures 30a-c which allows the $ED_n$ to gather more information about the incoming characteristics of the incoming electromagnetic radiation 13. For example, each ultra-small resonant structure 30a-c could be tuned to resonant at different frequencies of received EMR 13. In addition, one ultra-small resonant structure could be tuned to resonant in response to receiving EMR of a particular frequency while another ultra-small resonant structure is tuned to resonant in response to receiving EMR of a particular polarity.

The various micro-electromagnetic resonant detector cells $ED_n$ may be made, e.g., using techniques such as described in U.S. patent applications Ser. Nos. 10/917,511; 11/203,407 (described in greater detail above), or in some other manner.

The micro-electromagnetic resonant detectors cells $ED_n$ of an array may all be of the same type, or each may have a unique architecture, that is each may have a unique type of electrical beam source, each may use different ultra-small resonant structures, each may have a different number of ultra-small resonant structures, each may use different types of detector portions, and each may have a different number of detector portions or any combination of the foregoing. For example, an array could contain a number of the $ED_n$s shown in FIG. 2 and a number of the $ED_n$s shown in FIG. 3 where each $ED_n$ is responsive to a particular EMR characteristic (e.g. intensity, frequency, polarity, etc.). In the case where $ED_n$s of an array are responsive to the polarization of an EMR wave, each $ED_n$s can respond a different type of polarization (e.g. orthogonal polarizations).

More than one array of micro-electromagnetic resonant detector cells may be used within a signal imaging device. For example, an array could be used for each type of electromagnetic characteristic. Furthermore, when an imaging device comprises multiple arrays, the arrays can be configured such a way that their faces are on the same plane or the arrays can be configured so that each array faces a different direction, e.g. the faces of the arrays may be orthogonal to one another.

The mirco-electromagnetic resonant detector cells $ED_n$ may be formed at a linear density of 10,000 per inch.

The FPA described above may be included in any imaging device, including, without limitation, e.g. digital cameras, microbolometers and any device measuring EMR from the infrared to ultraviolet range. In theory, the present invention could be used to measure EMR throughout the EMR spectrum. It should be noted that the present invention is only limited by the degree to which a particle beam can be angularly modulated by an ultra-small electromagnetic detecting resonant structures receiving EMR and the degree to which angular modulations can be measured and correlated to characteristics of an EMR wave.

Furthermore, the FPA described in accordance with the present invention can be used in various imaging technologies such as: 3D imaging technologies that incorporate spinning arrays, imaging technologies that filter EMR before it is received by the FPA, imaging technologies that use multiple lenses and complex lens architectures, imaging technologies that use high shutter speeds, imaging technologies that measure reflected EMR and the like.

All of the ultra-small resonant structures described are preferably under vacuum conditions during operation. Accordingly, in each of the exemplary embodiments described herein, the entire package which includes the ultra-small resonant structures may be vacuum packaged. Alternatively, the portion of the package containing at least the ultra-small resonant structure(s) should be vacuum packaged. Our invention does not require any particular kind of evacuation structure. Many known hermetic sealing techniques can be employed to ensure the vacuum condition remains during a reasonable lifespan of operation. We anticipate that the devices can be operated in a pressure up to atmospheric pressure if the mean free path of the electrons is longer than the device length at the operating pressure.

While certain configurations of structures have been illustrated for the purposes of presenting the basic structures of the present invention, one of ordinary skill in the art will appreciate that other variations are possible which would still fall within the scope of the appended claims. While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

We claim:

1. A micro-resonant detector cell for use in a focal plane array comprised of a plurality of micro-electromagnetic resonant detector cells, the detector cell comprising:
   a source of at least one charged particle beam;
   at least one ultra-small resonant structure for receiving electromagnetic radiation and adapted to angularly modulate a charged particle beam in response to receiving electromagnetic radiation;
   at least one detector that measures the angular modulation of a charged particle beam.

2. The micro-resonant detector cell of claim 1, wherein said micro-electromagnetic resonant detector cell is adapted to determine the amplitude of an electromagnetic wave at a first frequency and to determine the amplitude of an electromagnetic wave at a second frequency.

3. The micro-resonant detector cell of claim 1, wherein said micro-electromagnetic resonant detector cell is adapted to determine the amplitude of an electromagnetic wave at a first polarization and to determine the amplitude of an electromagnetic wave at a second polarization.

4. A focal plane array comprised of a plurality of micro-electromagnetic resonant detector cells, the detector cells comprising:
   a source of at least one charged particle beam;
   at least one ultra-small resonant structure for receiving electromagnetic radiation and adapted to angularly modulate a charged particle beam in response to receiving electromagnetic radiation;
   at least one detector that measures the angular modulation of a charged particle beam.

5. The focal plane array of claim 4, wherein at least one of said micro-electromagnetic resonant detector cells is adapted to determine the amplitude of an electromagnetic wave at a first frequency and wherein at least one of said micro-electromagnetic resonant detector cells is adapted to determine the amplitude of an electromagnetic wave at a second frequency.

6. The focal plane array of claim 4, wherein at least one of said micro-electromagnetic resonant detector cells is adapted to determine the amplitude of an electromagnetic wave at a first frequency and the amplitude of an electromagnetic wave at a second frequency.

7. The focal plane array of claim 4, wherein a plurality of said micro-electromagnetic resonant detector cells are adapted to determine the amplitude of an electromagnetic wave at a first frequency and to determine the amplitude of an electromagnetic wave at a second frequency.

8. The focal plane array of claim 4, wherein at least one of said micro-electromagnetic resonant detector cells is adapted to determine the amplitude of the electromagnetic wave of a first polarization and at least one of said micro-electromagnetic resonant detector cells is adapted to determine the amplitude of the electromagnetic wave of a second polarization.

9. The focal plane array of claim 8, wherein said first polarization and said second polarization are orthogonal.

10. The focal plane array of claim 4, wherein at least one of said micro-electromagnetic resonant detector cells is adapted to determine the amplitude of the electromagnetic wave of a first polarization and to determine the amplitude of the electromagnetic wave of a second polarization.

11. The focal plane array of claim 4, wherein at plurality of said micro-electromagnetic resonant detector cells are adapted to determine the amplitude of the electromagnetic wave of a first polarization and to determine the amplitude of the electromagnetic wave of a second polarization.

12. A focal plane array comprised of a plurality of micro-electromagnetic resonant detector cells, the detector cells comprising:
- a source of at least one charged particle beam;
- at least one ultra-small resonant structure for receiving electromagnetic radiation and adapted to angularly modulate a charged particle beam in response to receiving electromagnetic radiation;
- at least one detector that measures the angular modulation of a charged particle beam, wherein said focal plane array is adapted to determine the polarization of incoming electromagnetic radiation and rotate to build an image of the polarized electromagnetic waves.

* * * * *